United States Patent
Miyauchi et al.

(10) Patent No.: US 9,602,685 B2
(45) Date of Patent: Mar. 21, 2017

(54) INFORMATION PROCESSING APPARATUS, CONTROL METHOD, AND STORAGE MEDIUM THAT GENERATE LEARNING DATA USED IN LEARNING A CLASSIFICATION RULE FOR CLASSIFYING AN INPUT IMAGE

(71) Applicant: CANON KABUSHIKI KAISHA, Tokyo (JP)

(72) Inventors: Takashi Miyauchi, Kashiwa (JP); Junya Arakawa, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/810,514

(22) Filed: Jul. 28, 2015

(65) Prior Publication Data
US 2016/0042254 A1 Feb. 11, 2016

(30) Foreign Application Priority Data

Aug. 7, 2014 (JP) .................................. 2014-161717

(51) Int. Cl.
| | |
|---|---|
| *G06K 9/62* | (2006.01) |
| *H04N 1/00* | (2006.01) |
| *H04N 1/387* | (2006.01) |
| *H04N 1/393* | (2006.01) |
| *G06K 9/00* | (2006.01) |

(52) U.S. Cl.
CPC ..... *H04N 1/00336* (2013.01); *G06K 9/00442* (2013.01); *G06K 9/6256* (2013.01); *H04N 1/387* (2013.01); *H04N 1/3872* (2013.01); *H04N 1/3878* (2013.01); *H04N 1/3935* (2013.01)

(58) Field of Classification Search
CPC .. H04N 1/00336; H04N 1/387; H04N 1/3935; H04N 1/3878; H04N 1/3872; G06K 9/00442; G06K 9/6256; G06K 9/66; G06K 9/6217; G06K 9/6282; G06F 17/30256
USPC ....... 382/159, 162, 156, 176, 132, 155, 224, 382/158, 118; 706/20, 25, 17, 18, 15; 704/504, 270, 503
See application file for complete search history.

(56) References Cited

U.S. PATENT DOCUMENTS 8,059,865 B2 * 11/2011 Deng ................. G06K 9/00711
  348/157
8,065,241 B2 * 11/2011 Vapnik ................ G06K 9/6269
  382/159

(Continued)

FOREIGN PATENT DOCUMENTS

WO 2010/101186 A1 9/2010

*Primary Examiner* — Sheela C Chawan
(74) *Attorney, Agent, or Firm* — Fitzpatrick, Cella, Harper & Scinto

(57) ABSTRACT

An information processing apparatus that generates learning data used in learning a classification rule for classifying an image that is input from an image input device. A reception unit receives an initial image that is input from the image input device. A first generation unit generates an image that is different from the initial image, by correcting the initial image using a coefficient determined based on information about a type of the input device. A second generation unit generates the learning data using the image generated by the first generation unit and the input image. A learning unit generates the classification rule using the learning data generated by the second generation unit.

24 Claims, 12 Drawing Sheets

(56) References Cited

U.S. PATENT DOCUMENTS

| | | | |
|---|---|---|---|
| 8,457,391 B2* | 6/2013 | Ai ................................. | 382/159 |
| 8,538,141 B2* | 9/2013 | Sakimura ............... | G06K 9/623 |
| | | | 382/159 |
| 8,818,103 B2 | 8/2014 | Noguchi et al. | |
| 9,053,358 B2* | 6/2015 | Yokono .............. | G06K 9/00389 |
| 9,307,920 B2* | 4/2016 | Mahajan ............ | A61B 5/04012 |

* cited by examiner

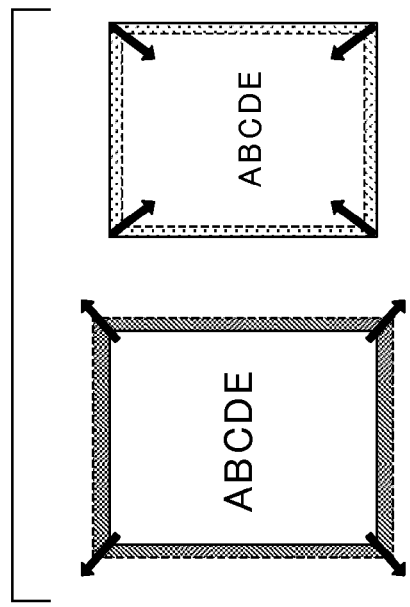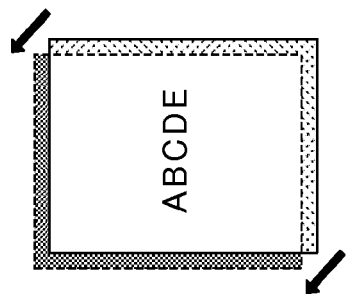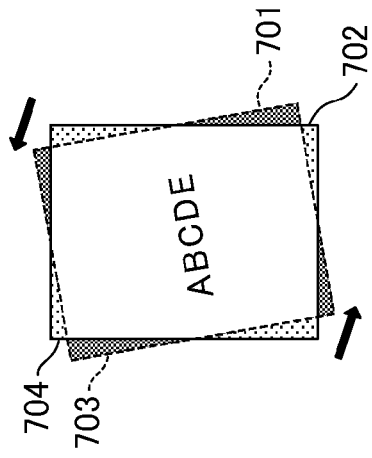

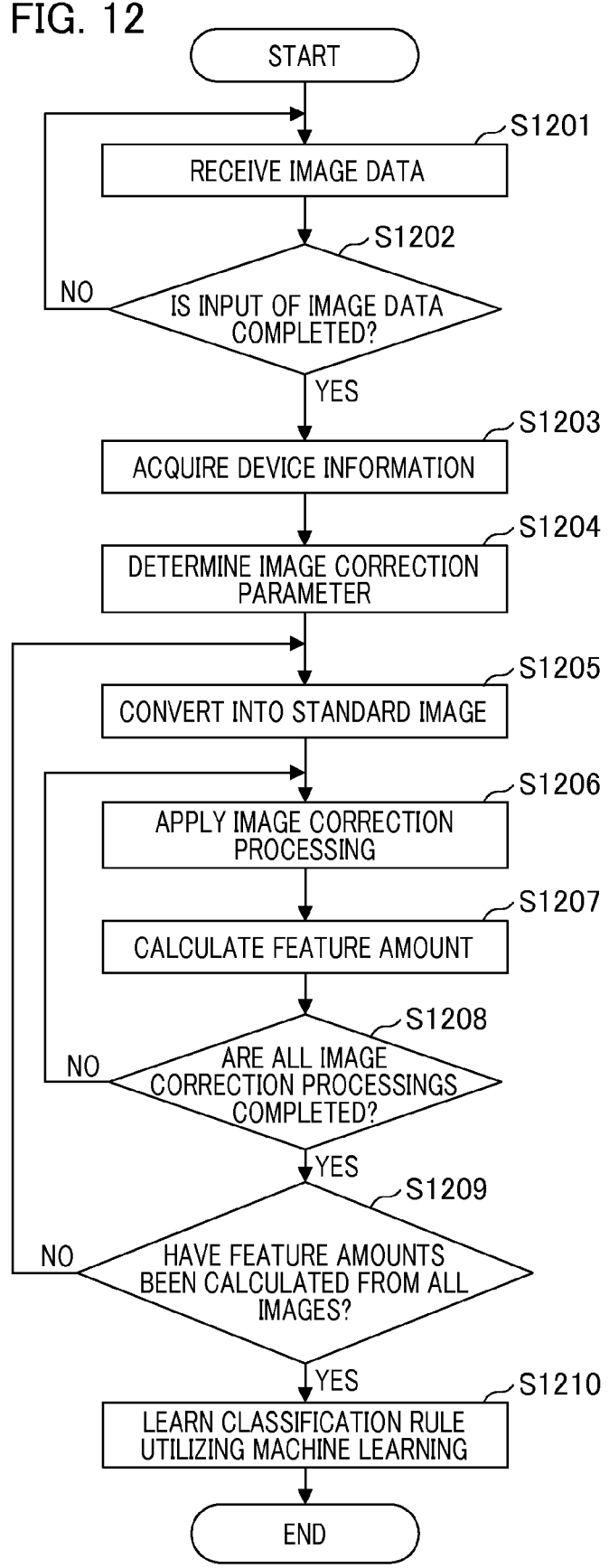

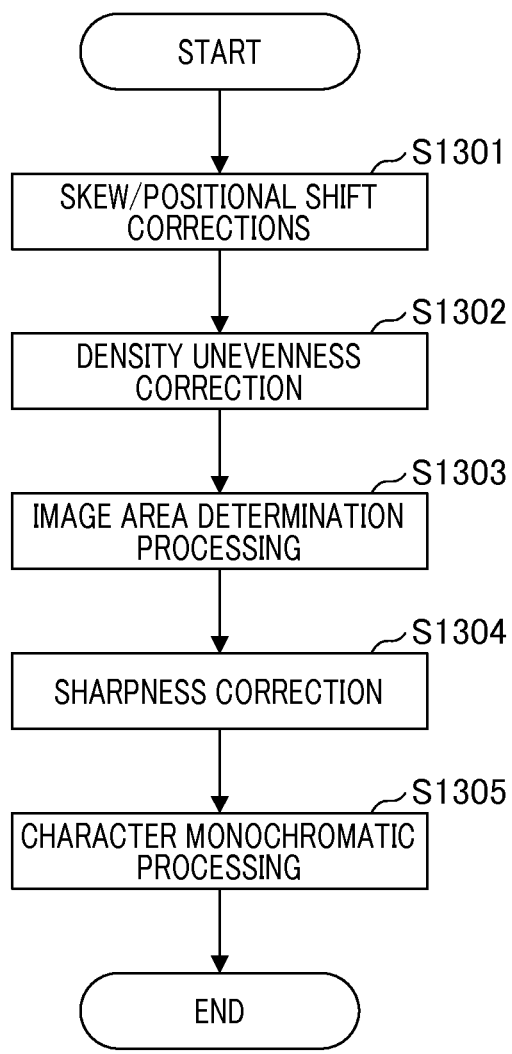

INFORMATION PROCESSING APPARATUS, CONTROL METHOD, AND STORAGE MEDIUM THAT GENERATE LEARNING DATA USED IN LEARNING A CLASSIFICATION RULE FOR CLASSIFYING AN INPUT IMAGE

This application claims the benefit of Japanese Patent Application No. 2014-161717, filed Aug. 7, 2014, which is hereby incorporated by reference herein in its entirety.

BACKGROUND OF THE INVENTION

Field of the Invention

The present invention relates to an information processing apparatus, a control method for the same, and a storage medium.

Description of the Related Art

As one of the technologies for improving the efficiency of a workflow handling paper ledger sheets, image classification utilizing machine learning has been proposed. The image classification utilizing machine learning, which generally has the two processes of learning and classification, is configured to construct a classification rule by learning with a given image group (learning set), and to classify an input image based on the constructed classification rule. In other words, the learning set is learning data used in learning the classification rule for classifying an image that is input into a system.

The application of the image classification utilizing machine learning to the workflow handling paper ledger sheets allows the storage and distribution destinations of a scanned image to be automatically determined, its file name to be automatically generated, and the like. Furthermore, if learning is performed with ledger sheets prepared for each customer, a classification rule that is individually customized can be constructed.

When the property of an image is different in learning and classification, a sufficiently high classification accuracy cannot be obtained. Thus, in general, a large number of images need to be prepared by predicting the images that will be input into classification. A method is known in which a system increases the number of images provided by a user that is utilized in learning in a case when a sufficient number or pattern of images cannot be prepared for a learning set including, for example, a case when learning is performed on site, when the property of an image is changed in classification, or the like.

International application no. WO2010/101186 discloses a method of increasing the number of learning images by performing image processing for mimicking the blur and shake that occur in photographing an image by a camera on a reference image.

A method of merely increasing the number of images photographed by a camera to generate images for a learning set may not, however, be effective as a method of generating a learning set used in classifying an image that is input from a device having a wide variety of characteristics. For example, assume that a camera-equipped mobile terminal photographs an image and inputs it into an information processing apparatus, which classifies the input image according to a classification rule constructed based on a learning set. In this case, the property of an image greatly varies depending on a wide variety of factors when being photographed, such as a distance, inclination, focal distance, light exposure, shutter speed, camera shake, or the like, of the camera-equipped mobile terminal, as well as the characteristic for each device, such as a depth of field, lens characteristic, whether a shake correction function is provided or not, or the like. Therefore, the information processing apparatus needs to generate a learning set suitable for classifying a wide variety of images that vary depending on the characteristic of the camera-equipped mobile terminal.

Moreover, except for a camera, such as a Multi Function Peripheral (MFP) equipped with a scan function, or the like, an image input device may also be used in a workflow handling paper ledger sheets. The MFP inputs a scan image into an information processing apparatus. Then, the information processing apparatus classifies the input scan image. Note that the properties of a scanned image and a camera image are different, and even each property of some scanned images greatly varies depending on a different mode of a scanner and a different standard of skew or positional shift of an image input device.

Thus, since the property of an image greatly varies depending on the type and characteristic of an image input device to be used, it may be useful to prepare a wide variety of images. However, preparing a huge number of images for a learning set by predicting all input images to be utilized in learning a classification rule may make the construction of a classification rule difficult, and may also increase the learning time.

SUMMARY OF THE INVENTION

The present invention provides an information processing apparatus that generates learning data of high quality used in learning a classification rule of an image depending on the type and characteristic of an image input device.

According to one aspect, the present invention provides an information processing apparatus that generates learning data used in learning a classification rule for classifying an image that is input from an image input device, the apparatus comprising a reception unit configured to receive an initial image that is input from an image input device, an acquiring unit configured to acquire device information on an image input device, a first generation unit configured to generate an image different from the initial image using a parameter determined based on the device information, and a second generation unit configured to generate the learning data using the image generated by the first generation unit and the input image.

The information processing apparatus according to the present invention can generate learning data of high quality depending on the type and characteristics of an image input device.

Further features of the present invention will become apparent from the following description of exemplary embodiments (with reference to the attached drawings).

BRIEF DESCRIPTION OF THE DRAWINGS

FIG. 7A is a diagram illustrating a rotation processing.

FIG. 7B is a diagram an illustrating a shift processing.

FIG. 7C is a diagram illustrating a scaling processing.

FIG. 12 is a diagram illustrating processing for learning an image classification rule according to a second embodiment.

FIG. 13 is a flowchart illustrating an example of a conversion processing for conversion into a standard image.

DESCRIPTION OF THE EMBODIMENTS

First Embodiment

Figure 1:
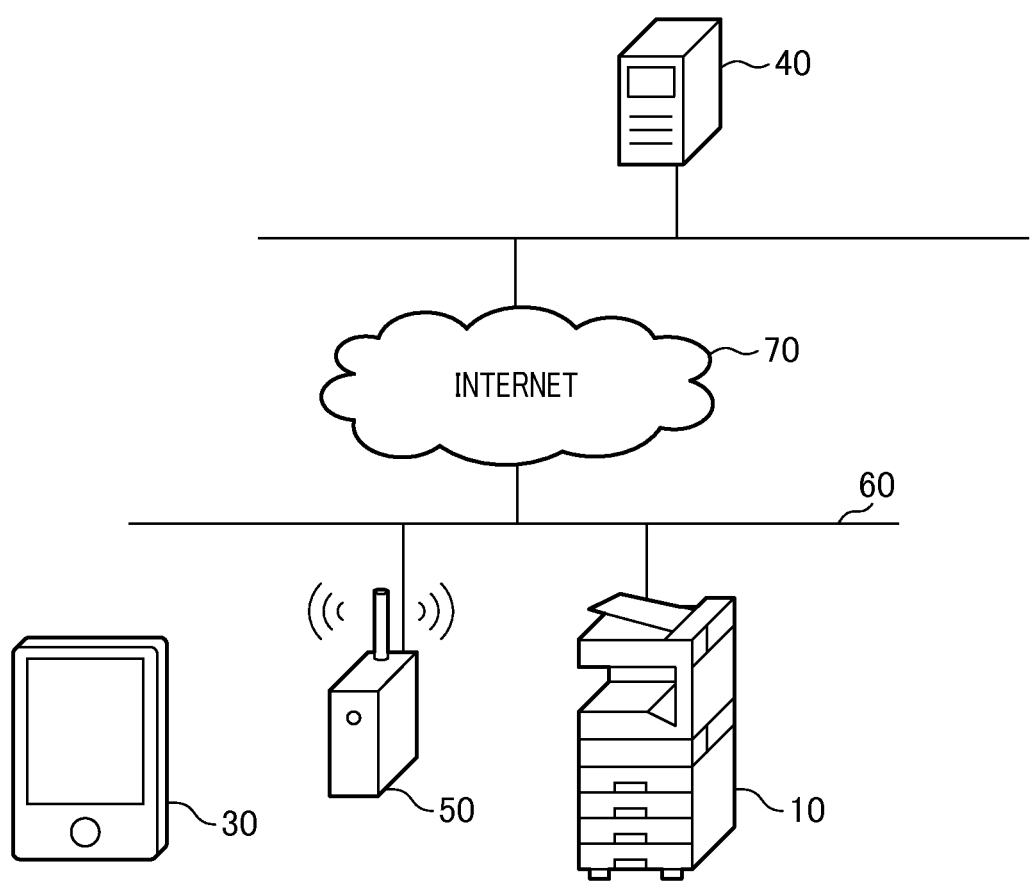
FIG. 1 is a diagram illustrating a system configuration according to a first embodiment.

FIG. 1 is a diagram illustrating a system configuration according to a first embodiment.

The system according to the first embodiment includes a server 40, a mobile terminal 30, and an MFP 10, which is an image input device.

A LAN 60 is connected to the MFP 10, which is an image processing apparatus, and a wireless router 50. The LAN 60 is connected to an Internet 70 and further to a server 40 providing a service through the Internet 70. The MFP 10, a mobile terminal 30, and the server 40 are connected to each other through the wireless router 50 and the LAN 60, and transmit/receive image data and various information to/from each other. In this example, the wireless router 50 and the MFP 10 are connected to, without limitation, the LAN 60, but the wireless router 50 and the MFP 10 may be connected by any method that can connect them to the server 40. The server 40 is an information processing apparatus that generates learning data used in learning a classification rule for classifying an image that is input from an image input device. Specifically, the server 40 generates the learning data by increasing the number of images that are input from the image input device, and constructs a classification rule of an image based on the generated learning data.

Figure 2B:
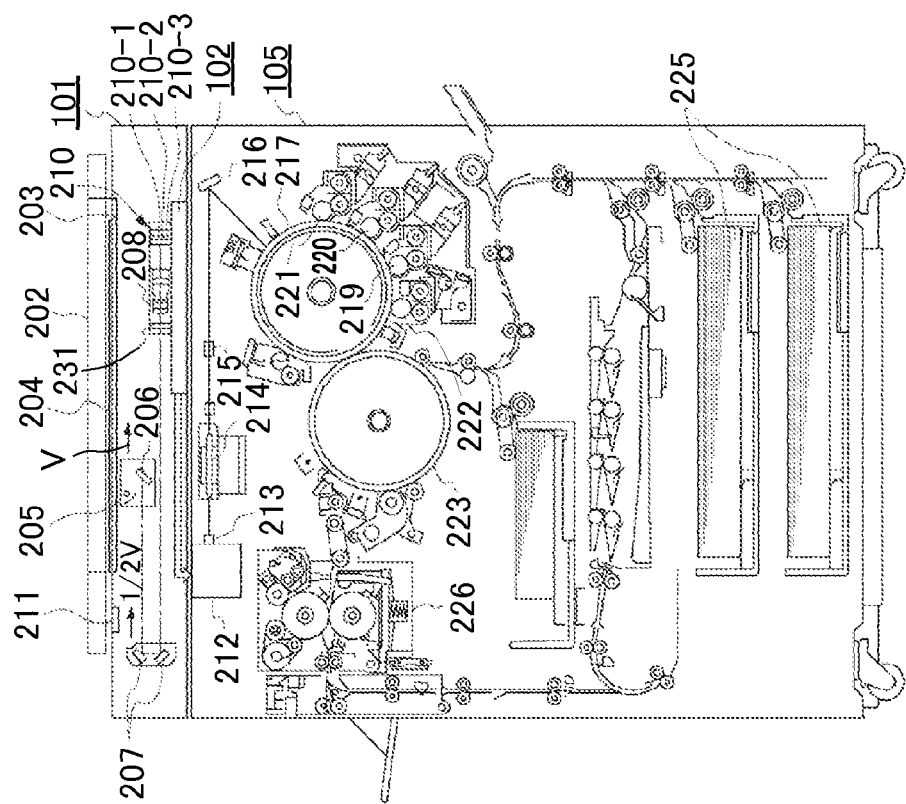
FIGS. 2A and 2B are diagrams illustrating a configuration example of a Multi-Function Peripheral (MFP).
Figure 2A:
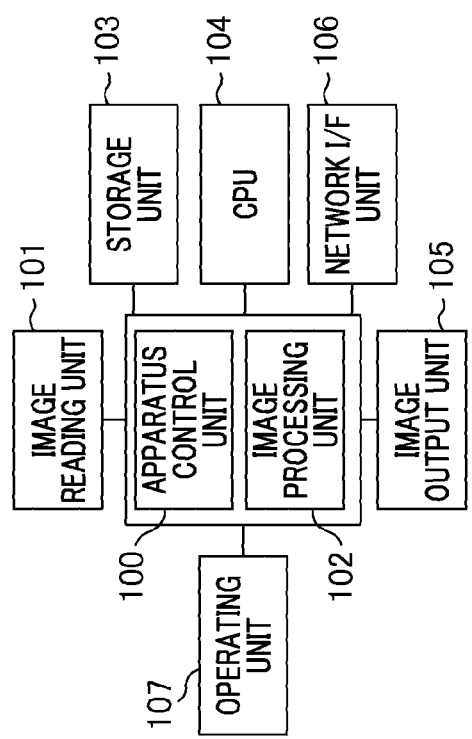

FIG. 2A is a diagram illustrating a configuration example of an MFP.

As shown in FIG. 2A, the MFP 10 includes an apparatus control unit 100, an image reading unit 101, an image processing unit 102, a storage unit 103, a CPU 104, an image output unit 105, a network I/F unit 106, and an operating unit 107.

The apparatus control unit 100 transfers data within the MFP or to/from an external apparatus through the network I/F unit 106, and receives an operation from the operating unit. The image reading unit 101 reads an image of an original copy and outputs the image data. The image processing unit 102 converts print information, including the image data that is input from the image reading unit 101 or the external apparatus, into the intermediate information (hereafter referred to as an "object"), and stores it in the object buffer of the storage unit 103. The object has attributes of texts, graphics, and images. Furthermore, the image processing unit 102 generates bit map data based on the buffered object and stores it in the buffer of the storage unit 103. At that time, a color conversion processing, density adjustment processing, toner total amount control processing, video count processing, printer gamma correction processing, and/or pseudo halftone processing, such as dithering, are performed.

The storage unit 103 is composed of a ROM, a RAM, a hard disk (HD), and the like. The ROM stores various control programs and image processing programs executed by the CPU 104. The RAM is used as a reference area or work area in which the CPU 104 stores data and various information. The RAM and the HD are used as the object buffer, or the like, described above. On the RAM and the HD, image data is accumulated and sorted by pages, an original copy having multiple pages that have been sorted is accumulated, and multiple copies are output by a printer.

The image output unit 105 forms a color image and outputs the image on a recording medium, such as a recording paper. The network I/F unit 106 connects the MFP 10 to the LAN 60, through which the MFP 10 transmits/receives various information to/from the Internet 70 or other apparatus. The operating unit 107 includes a touch panel and/or an operation button, receives an operation from a user, and sends the information on the operation to the apparatus control unit 100.

FIG. 2B illustrates the external appearance of the MFP 10. In the image reading unit 101, an original copy 204, of which an image is to be read, is placed between an original copy table glass 203 and an original copy pressure plate 202, and the original copy 204 is irradiated with the light of a lamp 205. The reflected light from the original copy 204 is directed to mirrors 206 and 207, and the image is formed on a three-line sensor 210 by a lens 208, to which an infrared cut filter 231 is provided. A motor (not shown) moves a mirror unit, including the mirror 206 and the lamp 205, at a speed V and a mirror unit, including the mirror 207, at a speed "2/V" in the direction shown by the arrows. In other words, the mirror units move in the vertical direction (sub scanning direction) to the electrical scanning direction (main scanning direction) of the three-line sensor 210 to scan the whole area of the original copy 204.

The three-line sensor 210 composed of a three-line CCD performs color separation on the light information to be input, reads each color component, red (R), green (G), and blue (B), of full color information, and sends their color component signals to the image processing unit 102. Each CCD that constitutes the three-line sensor 210 has 5000 pixels of light-receiving elements, and can read an original copy having an A3 size (maximum size) that can be placed on the original copy table glass 203 at 600 dpi resolution in the short-side direction (297 mm) of the copy.

A standard white board 211 corrects data that is read by each of CCDs 210-1 to 210-3 of the three-line sensor 210. The standard white board 211 has a white color exhibiting a nearly uniform reflection property under a visible light.

The image processing unit 102 electrically processes image signals that are input from the three-line sensor 210 to generate signals of each color component, cyan (C), magenta (M), yellow (Y), and black (K), and sends the generated color component signals of CMYK to the image output unit 105. The image processing unit 102 similarly processes image data that is input from an external apparatus as well, and sends the generated color component signals of CMYK to the image output unit 105. The image output at this point is a CMYK image that has been subject to a pseudo halftone processing, such as dithering. The image processing unit 102 also provides header information, such as the manufacturer name and model name of an MFP, an image resolution, other reading setting(s), and the like, to the image header. This header information is utilized for acquiring device information on an image input device as described below.

The image output unit 105 sends C, M, Y, or K image signals that are sent from the image reading unit 101 to a laser driver 212. The laser driver 212 drives a semiconductor laser element 213 while modulating it depending on an input image signal. A laser beam output from the semiconductor laser element 213 scans a photoconductive drum 217 through a polygon mirror 214, an f-θ lens 215, and a mirror 216, and forms an electrostatic latent image on the photoconductive drum 217.

A developing unit is composed of a magenta developing unit 219, a cyan developing unit 220, a yellow developing unit 221, and a black developing unit 222. The four developing units alternately come into contact with the photoconductive drum 217 and develop the electrostatic latent image formed on the photoconductive drum 217 with toners having the corresponding colors to form the toner images. A recording paper provided from a recording paper cassette 225 is wound around a transfer drum 223, and the toner images on the photoconductive drum 217 are transferred to the recording paper. The recording paper, to which the toner images, each having one of the four C, M, Y, and K colors have been sequentially transferred in this way, is passed through a fixing unit 226 for being fixed, and then is discharged outside of the apparatus.

Figure 3:
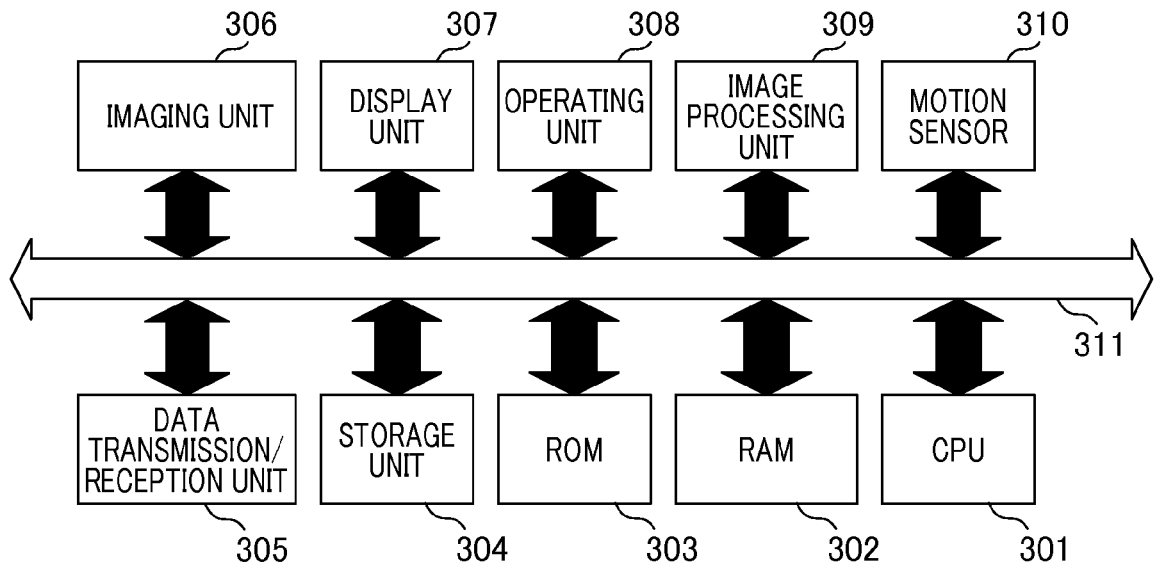
FIG. 3 is a diagram illustrating a configuration example of a mobile terminal.

FIG. 3 is a diagram illustrating a configuration example of a mobile terminal.

The mobile terminal 30 includes components from a CPU 301 to a motion sensor 310. The CPU 301, a RAM 302, a ROM 303 transmits/receives programs and data through a data bus 311. The data bus 311 is connected to a storage unit 304, a data transmission/reception unit 305, an imaging unit 306, a display unit 307, an operating unit 308, an image processing unit 309, and the motion sensor 310. Furthermore, their components, as well as the CPU 301, the RAM 302, the ROM 303 transmits/receives programs and data to/from each other.

The storage unit 304 is a flash memory where image data and various programs are stored. The data transmission/reception unit 305 has a wireless LAN controller, and achieves transmission/reception of data to/from the server 40 through the wireless router 50. The imaging unit 306 is a camera for photographing an original copy to acquire the photographed image. The data of the acquired photographed image is provided with header information, such as the manufacturer name and model name of the mobile terminal, an image resolution, diaphragm (F value), focal distance, or the like, which is sent to each unit as described below. This header information is utilized for acquiring device information on an image input device as described below.

The display unit 307 is a touch panel display for displaying a live view when photographing an original copy using a camera function and various information such as completion notification of learning according to the present embodiment, or the like. The operating unit 308, which is a touch panel or an operation button, receives an operation from a user and sends the information on the operation to each unit.

The image processing unit 309 extracts an original copy from a photographed image data. The motion sensor 310, which is equipped with a triaxial acceleration sensor, an electronic compass, and a triaxial angular velocity sensor, can detect the attitude and movement of the mobile terminal 30 using a known technology. Additionally, these components in the mobile terminal 30 are controlled by causing the CPU 301 to execute the program(s) held by the ROM 303 or the storage unit 304.

Any terminal apparatus having a camera function can be applied to the present invention. Specifically, the mobile terminal 30 may be a smartphone or a mobile telephone having a camera function, or a digital camera having a communication function.

Figure 4:
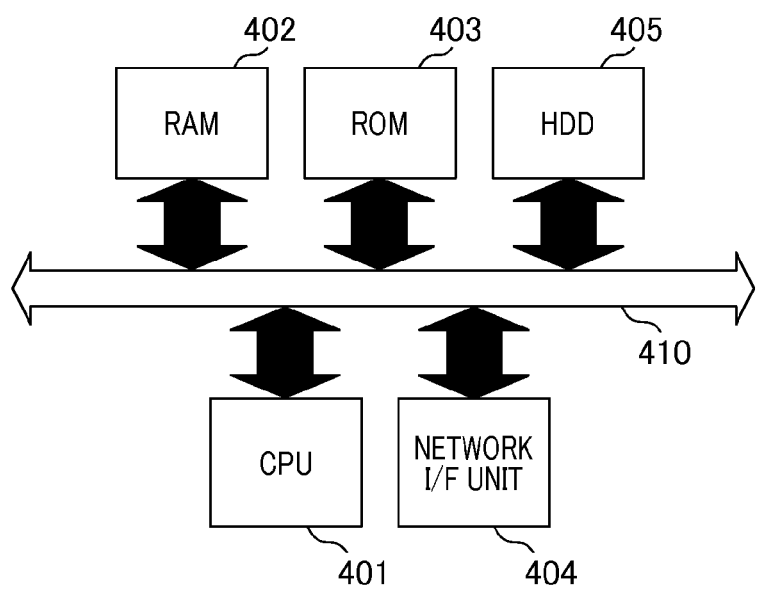
FIG. 4 is a diagram illustrating a configuration example of a server.

FIG. 4 is a diagram illustrating a configuration example of a server.

The server 40 includes components from a CPU 401 to a network I/F unit 404.

The CPU 401 reads out control programs stored in a ROM 403 to execute various control processes. A RAM 402 is used as a temporary storage area, such as a main memory of the CPU 401, a work area, or the like. The network I/F unit 404 connects the server 40 to the Internet 70, through which the server 40 transmits/receives various information to/from other apparatuses. An HDD 405 stores image data, feature amount data, and various programs.

In FIG. 4, image data received from the MFP 10 or the mobile terminal 30 through the network I/F unit 404 are transmitted/received by the CPU 401, RAM 402, ROM 403 through a data bus 410. An image processing on image data is realized by causing the CPU 401 to execute image processing programs stored in the ROM 403 or the HDD 405.

Figure 5:
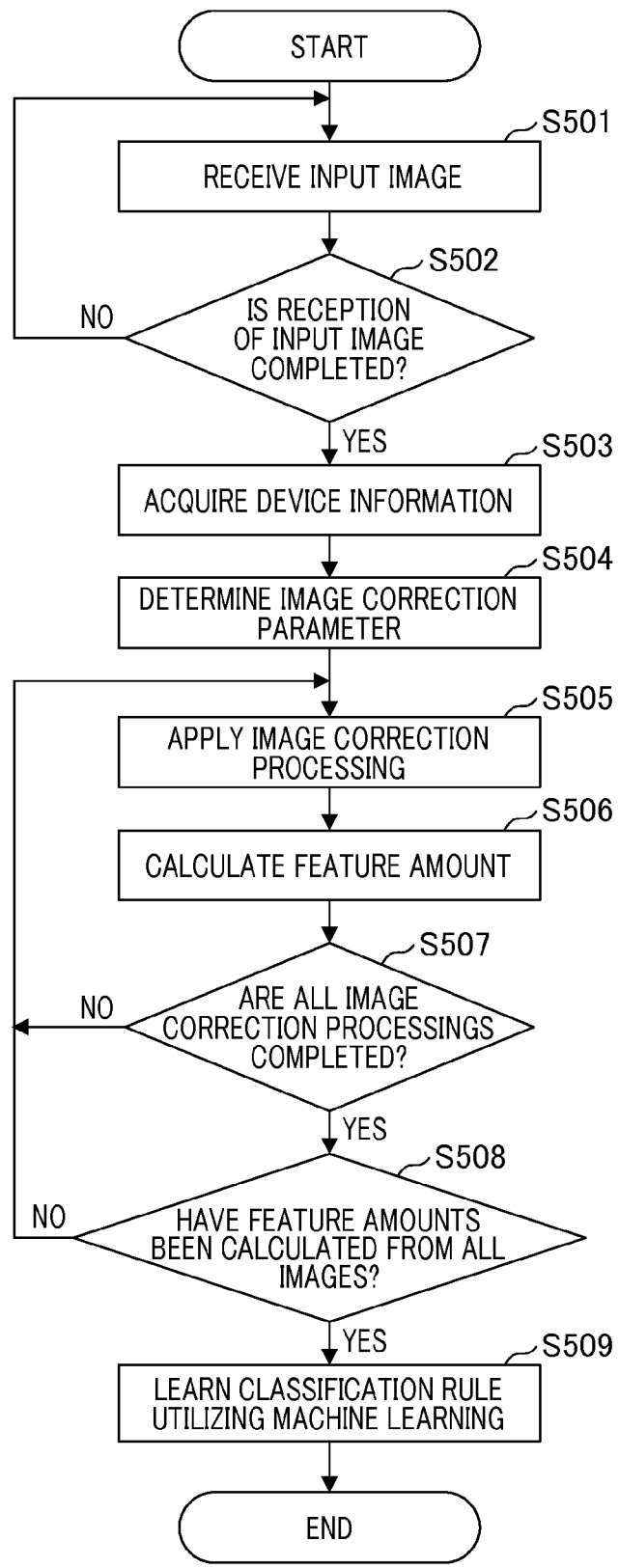
FIG. 5 is a diagram illustrating one example of processing for learning an image classification rule by a server.

FIG. 5 is a flowchart illustrating one example of processing for learning an image classification rule by a server.

The processing shown in FIG. 5 is realized by causing the CPU 401 to load a processing program stored in the HDD 405 into the RAM 402 and to execute the program.

First, the CPU 401 receives image data that is input from an image input device (the MFP 10 or the mobile terminal 30) through the LAN 60 and the Internet 70 (step S501). The CPU 401 records the received image data on the HDD 405 as an initial image.

In the present embodiment, the learning processing of an image classification rule is performed on the condition that an image input device is limited to one device. Therefore, when the MFP 10 inputs image data, the image input device will be the MFP 10 and the operating unit will be the operating unit 107 in the subsequent processing. By contrast, when the mobile terminal 30 inputs image data, the image input device will be the mobile terminal 30 and the operating unit will be the operating unit 308 in the subsequent processings. Additionally, the mobile terminal 30 extracts an original copy from an image obtained by photographing the image (photographed image), and inputs the extracted image of the original copy into the server 40. The details on the processing for extracting the original copy will be described below with reference to FIG. 6.

Next, the CPU 401 of the server 40 determines whether or not image data input is completed (step S502). When a user provides instructions for the completion of image data input with the operating unit 107 (FIG. 2) or the operating unit 308 (FIG. 3), the CPU 401 receives these instructions through the network I/F unit 404. Therefore, the CPU 401 determines that the image data input is completed when these instructions have been received. When the image data input is not completed, the processing returns to step S501. When the image data input is completed, the processing proceeds to step S503. Note that other methods may be employed for the determination processing in step S502. For example, a method is contemplated in which the server 40 counts the number of input images and it is determined that the image data input is completed when the maximum number of input images, which has been preset through the operating unit 107 or 308 by a user, is reached.

Next, the CPU 401 acquires device information on an image input device from the header information on the image data recorded on the HDD 405 as the initial image (step S503). In the present embodiment, it is contemplated that the same image input device is used in learning and classification. Therefore, the device information acquired in step S503 is also the device information on an image input device for inputting an image of a classification target. The device information is information necessary for identifying an image input device, such as the manufacturer name and the model name of the MFP 10 or the mobile terminal 30. Note that the method of acquiring device information is not limited to the above-described method. A user may set the device information through the operating unit 107 or 308.

Next, the CPU 401 determines an image correction parameter for generating an additional image based on the device information acquired in step S503 (step S504). Specifically, the CPU 401 generates an additional image different from the initial image by correcting the initial image depending on the characteristics of an image input device. The image correction includes at least any of a rotation processing, shift processing, scaling processing, and blurring processing. The image correction parameter is for determining the degree of the rotation processing, shift processing, scaling processing, or blurring processing.

An image change that may occur to an image that is input from an image input device when classifying the image can be reproduced based on the property of an image input device to be used by switching image correction parameters. For example, when an image input device to be used is the MFP 10, the CPU 401 determines an image correction parameter based on the standard in scanning about the skew or positional shift of the image reading unit 101, or the like. This will make an image change amount reproduced by an image correction small as compared with the case when an image is photographed by the mobile terminal 30. The details on the image correction and the method to determine an image correction parameter will be described below.

Next, the CPU 401 selects one of the initial images registered on the HDD 405 in step S501 and performs image correction processing on the selected image using the image correction parameter determined in step S504 to generate an additional image different from the initial image (step S505, first generation unit). Note that the image correction processing can be applied in combination to generate additional images of more patterns. In the present embodiment, the CPU 401 selects one pattern from all combinations of the image correction processing.

Next, the CPU 401 calculates an image feature amount from the additional image generated in step S505 (step S506). This allows learning data used in learning a classification rule to be generated (second generation unit). The CPU 401 records only the image feature amount on the HDD 405 and discards the additional image data. In the present embodiment, it is contemplated that all image feature amounts are calculated from the additional images in advance, and the feature amount group is used as learning data for learning a classification rule. Of course, the CPU 401 may record the additional images on the HDD 405 as needed. The details on the image feature amount used in the present embodiment will be described below.

Next, the CPU 401 determines whether or not all image correction processing is completed (step S507). When some of the image correction processing is not completed, the processing returns to step S505. When all image correction processing is completed, the processing proceeds to step S508.

Next, the CPU 401 determines whether or not the image feature amounts have been calculated from all images (step S508). When some of the image feature amounts have not been calculated, the processing returns to step S505. When the image feature amounts have been calculated from all images, the processing proceeds to step S509.

Next, the CPU 401 generates a classification rule from the feature amount group stored on the HDD 405 utilizing machine learning (step S509). The details on the machine learning to be utilized will be described below.

<Details on Original Copy Extraction Processing>

Processing for extracting an image of an original copy from a photographed image will be described that is executed by the image processing unit 309 (FIG. 3) when the mobile terminal 30 is utilized as an image input device in the present embodiment. The mobile terminal 30 inputs an image of an original copy extracted from a photographed image as an input image into the server 40. When the imaging unit 306 photographs an original copy, the image processing unit 309 extracts the vertices of the original copy area in the photographed image.

Figure 6:
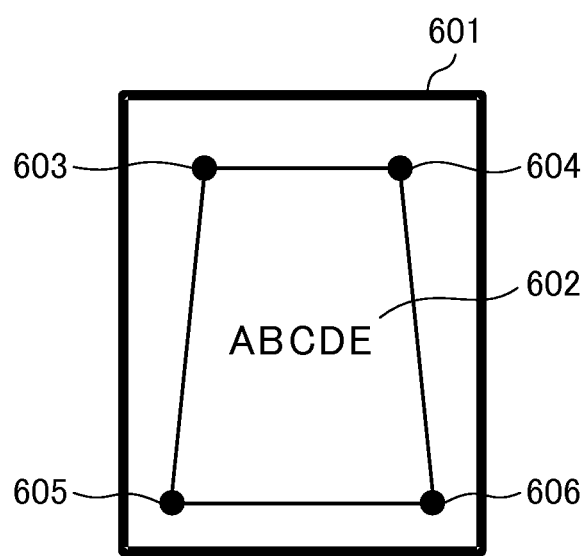
FIG. 6 is a diagram illustrating one example of a photographed image and an original copy area.

FIG. 6 is a diagram illustrating one example of a photographed image and an original copy area.

Reference numeral 601 in the figure indicates a photographed image. An original copy area 602 is a rectangular area surrounded by the line segments connecting vertices 603, 604, 605, and 606 of the original copy area. The vertices 603 to 606 of the rectangular original copy area are extracted by a known method such as, for example, a Douglas-Peucker vertex extraction algorithm. The image processing unit 309 calculates a magnification parameter based on the size of the original copy area in the photographed image.

The image processing unit 309 calculates a magnification parameter such that the original copy area in the photographed image is magnified to an output image size. The calculated magnification parameter will be a projective transformation matrix when considering that the image has been distorted into a trapezoid. A projective transformation matrix can be calculated based on the information on the four vertices (vertices 603, 604, 605, and 606) of the original copy area in the photographed image and the coordinate information on the four corners of the output image by a known method. When the processing speed is prioritized, the image processing unit 309 may calculate an affine transformation matrix or a simple magnification rate as a magnification parameter. The image processing unit 309 obtains an image of an original copy area extracted from a photographed image by performing magnification processing on the original copy area in the photographed image data using a magnification parameter.

<Details about the Type of Image Correction and the Method for Determining the Image Correction Parameter>

In the present embodiment, the CPU 401 of the server 40 performs a rotation processing, shift processing, scaling processing, or blurring processing as an image correction on an image to reproduce an image change that may occur to an input image in classification. Additionally, the CPU 401 determines an image correction parameter based on device information in order to reproduce an image change based on the property of an image input device to be used.

In the present embodiment, the CPU 401 calculates one image correction parameter for each image correction. Specifically, the CPU 401 calculates an image correction parameter corresponding to the maximum image change amount predicted based on device information for each image correction. This is for avoiding enormous numbers of the combinations from being formed when multiple parameters are prepared for each image correction, because each image correction is applied in combination in the present embodiment. This is also because an image having the predicted maximum change is an image near the boundary in the feature amount space, and therefore, its use in learning enables learning a classification rule with high accuracy. The image correction processing and the method of determining an image correction parameter will be described below.

FIGS. 7A to 7C are diagrams illustrating the rotation processing, shift processing, and scaling processing as examples of the image correction. This geometric transformation processing is performed using a projective transformation matrix. FIG. 7A illustrates an example of rotation processing. In rotation processing, the CPU 401 executes a projective transformation on an input image using a rotation matrix, and obtains an output image 702 by cutting out an image from an image 701 after the transformation. The rotation processing has two patterns of clockwise and counterclockwise rotations, by which an input image can be rotated around the center of the image in either direction by a predetermined angle. The input image and the output image have the same size. The CPU 401 discards an out-of-image area 703 that is protruding from the output image 702 after the projective transformation. Furthermore, the CPU 401 complements a deficient area 704 having no projection origin in the output image 702 by sequentially copying a pixel value of a non-deficient pixel for each pixel in the deficient area 704. This handling of the deficient area 704 is not limited to the above-described complementation method. For example, other complementation methods may be used, such as a method in which a deficient pixel is displaced with a background pixel that is assumed from an input image, or a method without complementation in which flag information denoting a deficient pixel is given to the deficient pixel, and is utilized for a mask processing.

The image correction parameter of the rotation processing is a rotation angle. When the image input device is the MFP 10, the CPU 401 determines a rotation amount based on the standard about the skew of the image reading unit 101. When an image input device is the mobile terminal 30, the CPU 401 determines a rotation amount based on image deterioration caused by original copy extraction from an photographed image. Since the amount of image deterioration caused by original copy extraction from an photographed image may vary depending on a means for detecting an original copy area, a trapezoid correction means for performing a projective transformation on the original copy area to generate an image, or a photographing condition, a value is used that is experimentally determined in advance from the algorithm to be used or photographing condition.

FIG. 7B illustrates an example of the shift processing. In the shift processing, the CPU 401 performs a projective transformation on an input image using an image translation matrix to obtain the output image. The shift processing has a total of eight patterns formed by combining the shifts in the up-and-down and right-and-left directions, which can shift an image in any direction among them by a predetermined amount. The output image size and how to handle a deficient area after the projective transformation are similar to those in the rotation processing.

The image correction parameter of the shift processing is a shift amount. When the image input device is the MFP 10, the CPU 401 determines a shift amount based on the standard about the positional shift in the main and sub scanning directions of the image reading unit 101. When the image input device is the mobile terminal 30, the CPU 401 determines a shift amount using the value experimentally determined based on image deterioration caused by original copy extraction from a photographed image as in the rotation processing.

FIG. 7C illustrates an example of the scaling processing. In the scaling processing, the CPU 401 performs a projective transformation on an input image using a scaling matrix to obtain the output image. The scaling processing, which has two patterns, enlargement and reduction, can scale the input image by a predetermined amount determined based on device information. The image correction parameter of the scaling processing is a scaling rate in the horizontal and vertical directions. The output image size and how to handle a deficient area after the projective transformation are similar to those in the rotation and shift processings. When the image input device is the MFP 10, the CPU 401 determines a scaling rate based on the standard about the reading magnification of the image reading unit 101. When the image input device is the mobile terminal 30, the CPU 401 determines a scaling rate using the value experimentally determined based on image deterioration caused by original copy extraction from a photographed image as in the rotation and shift processings.

In the blurring processing, the CPU 401 applies a Gaussian filter as one of the smoothing filters to an input image to generate the blurred image. It is known that, with a Gaussian filter, the smoothing amount of an image is varied with the kernel size's change and an image becomes blurred when the kernel is made asymmetric between the horizontal and vertical directions. For example, when the kernel size in the horizontal direction becomes large, as compared with that in the vertical direction, an image becomes blurred in the horizontal direction. Therefore, the blurring processing has three patterns of blurring of the entire image, blurring in the horizontal direction, and blurring in the vertical direction, and the image correction parameter is a kernel size that determines a blurring or shaking amount.

When the image input device is the MFP 10, the CPU 401 uses a Look-Up-Table (LUT), in which the correspondence information between the MTF characteristic of the three-line sensor 210 and a blurring amount are preset, to determine a blurring amount and thus, a kernel size. When the image input device is the mobile terminal 30, the CPU 401 uses a blurring amount determined by an LUT made in advance from the relationship between the MTF characteristic of a lens and a blurring amount, and shaking amounts in the horizontal and vertical directions that are experimentally determined.

The details for each of the image correction and the method of determining an image correction parameter have been described above. As with the case when a scanned original copy is inclined, as well as when a scan image becomes blurred for example, image changes, however, do not necessarily occur separately. Additionally, as with the case when a positional shift and blurring occur, but rotation does not occur, all image changes do not necessarily occur simultaneously. Therefore, the CPU 401 adds a pattern of the case with no occurrence to the patterns of each image correction processing and generates additional images by the number of combinations of all patterns of image corrections. Specifically, the pattern with no correction is added to the patterns of each image correction processing described above. Since the rotation processing has three (3) patterns, the shift processing has nine (9) patterns, the scaling processing has three (3) patterns, and the blurring processing has four (4) patterns, the CPU 401 generates additional images of 324 patterns (3×9×3×4=324).

Note that the number of the above-described patterns of additional images is not limited to the above-described number. For example, more parameters of each image correction may be prepared to increase the number of patterns, or the number of combinations of patterns may be limited to reduce the number thereof.

For the image correction with a geometric change, such as the rotation processing, shift processing, and scaling processing, a projective transformation matrix reflecting each parameter is prepared. This is for avoiding a deficient area from being enlarged when the processing is performed independently. Of course, with any method for preventing a deficient area from being enlarged, the image correction may be performed while ensuring a large image size in the middle of the processing.

<Details on Image Feature Amount to be Used>

In the present embodiment, an image feature amount is calculated by the server 40 (step S506 in FIG. 5) on the condition that the layout is not changed in the same type of document images. The CPU 401 cuts out a part of an image as a patch and calculates an image feature amount for each patch image based on gradient information.

Figure 8:
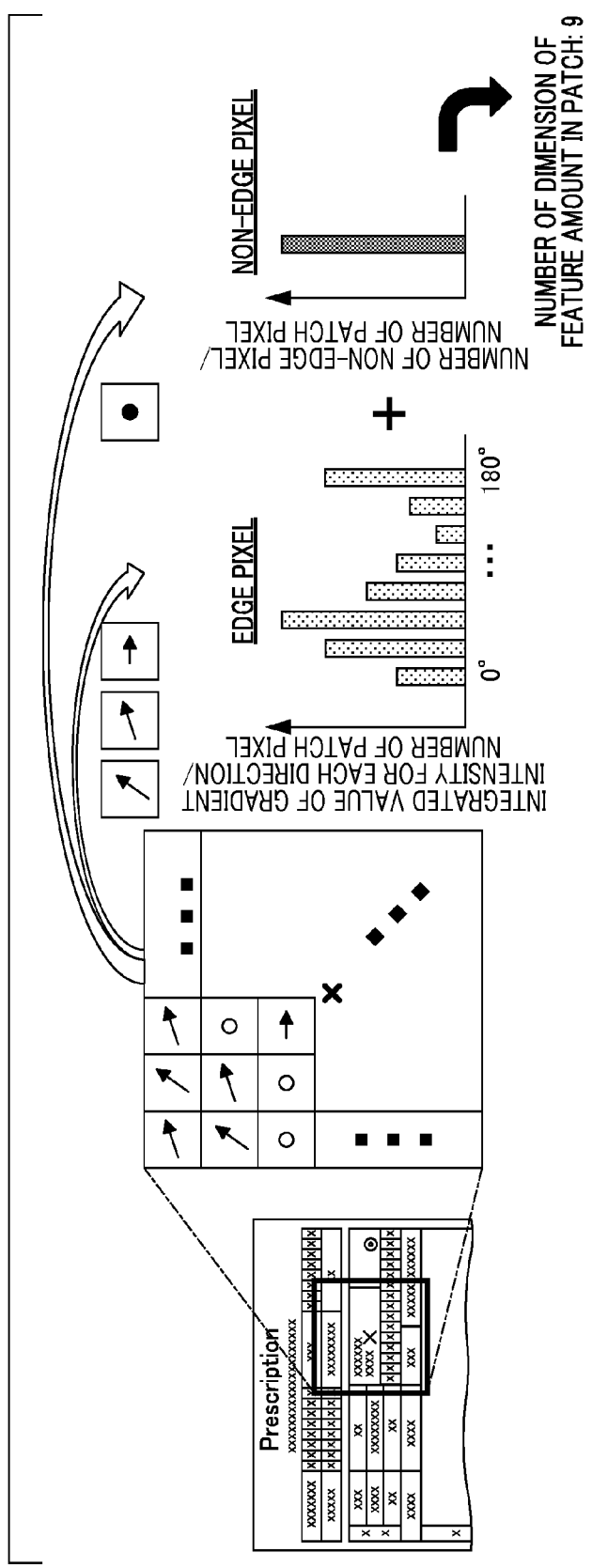
FIG. 8 is a diagram illustrating how to calculate an image feature amount based on gradient information.

FIG. 8 is a diagram illustrating how to calculate an image feature amount based on gradient information.

As shown in FIG. 8, the gradient intensity and the gradient direction that are determined for each pixel in a patch image are utilized. Specifically, the CPU 401 determines gradient intensity and gradient direction for all pixels in a patch image from edge information in the vertical and horizontal directions. The CPU 401 calculates nine-dimensional (nine) feature amounts from one patch utilizing the gradient information as shown in FIG. 8. First, for each pixel, a pixel having a gradient intensity of a predetermined value or higher is set to be an edge pixel, while a pixel having a gradient intensity of less than the predetermined value is set to be a non-edge pixel. The gradient direction of an edge pixel group is quantized into eight directions to calculate an "integrated value of the gradient intensity for each direction/number of patch pixel", which is combined with "number of non-edge pixel/number of patch pixel" to calculate nine-dimensional feature amounts from one patch image. Thus, not only information on a ruled line and a character, but also, a margin that is a remarkable feature of a document image can be represented by utilizing edge and non-edge pixels. The feature amount for one patch image has been described above, but, in practice, a plurality of patch images are cut out and used in order to utilize many of the feature amounts.

Figure 9:
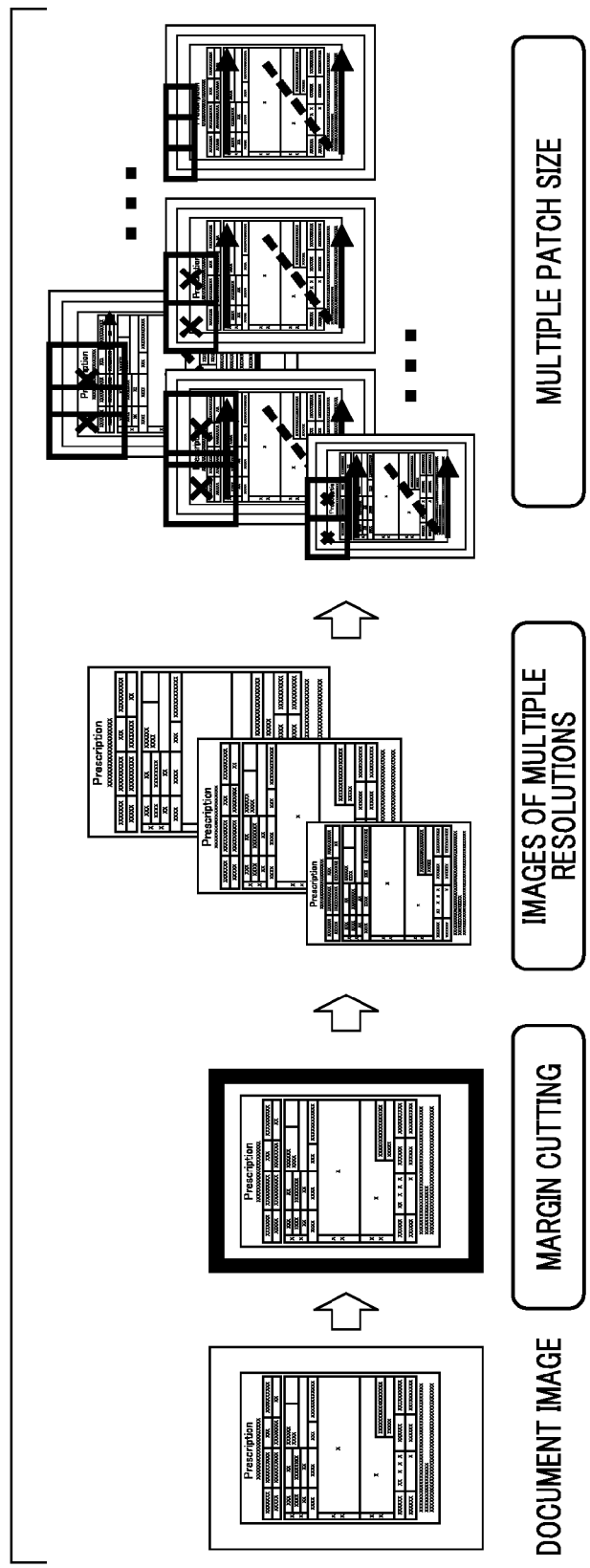
FIG. 9 is a diagram illustrating how to cut out a patch image.

FIG. 9 is a diagram illustrating how to cut out a patch image.

First, the CPU 401 deletes the edge of an image where noise tends to occur, and generates images having various resolutions. The images having various resolutions are prepared, because the structure of an edge varies depending on the resolution. Then, the CPU 401 cuts out patch images having various sizes from an image of each resolution while scanning to calculate a feature amount that take into account the position of the patch image. For example, assume a case when a feature amount is extracted from an image scanned at 300 dpi. First, the CPU 401 generates two types of images, each being reduced to ¼ or ⅛ the size of the scan image. The CPU 401 cuts out a total of 250 patches from the images of each resolution being reduced to ¼ and ⅛ the size, by cutting out 25 patches (5×5=25) by shifting the patch image of ¼ the size by ⅕ of the image and 100 patches (10× 10=100) by shifting the patch image of ⅛ the size by ¹/₁₀ of the image. Since a nine-dimensional edge feature amount is calculated from each patch at such a setting, 2250-dimensional feature amounts can be calculated from one image.

Note that the parameters for an image resolution, a patch size, and a position for cutting out a patch are not limited to the above-described numbers. Furthermore, an edge feature amount of a scale/rotation invariant, such as known SIFT or ORB, may be used as the image feature amount to be calculated. Alternatively, a color histogram, a chromatic dispersion, or the like, may be used as the image feature amount in order to utilize information on the color of an original copy.

<Details on Machine Learning to be Utilized>

Next, a machine learning method utilized in the present embodiment will be described. A known machine learning method called "Real Adaboost" is utilized in the present embodiment. "Real Adaboost" is a method by which feature amounts suitable for classifying a given learning data set can be selected among a lot of feature amounts and combined with each other to construct a classifier. When a lot of feature amounts are used in classifying an image, the performance of a computer may decline due to the computational load of the feature amounts. Thus, "Real Adaboost" has a major advantage in that only some feature amounts suitable for classification are selected and used to construct a classifier. However, "Real Adaboost" is a two-class classifier that classifies data with two types of labels. In other words, it cannot apply to the classification of more than two types of document images by itself. Therefore, a known method called One-Versus-All ("OVA") is utilized in order to extend a two-class classifier into a multiclass classifier. In "OVA", classifiers for classifying one class (target class) from the others are constructed in the number of a class, and the output of each classifier is defined as the confidence of each target class. In classification, data that is desired to be classified is input into all classifiers, and the class having the highest confidence is set as the classification destination.

Figure 10:
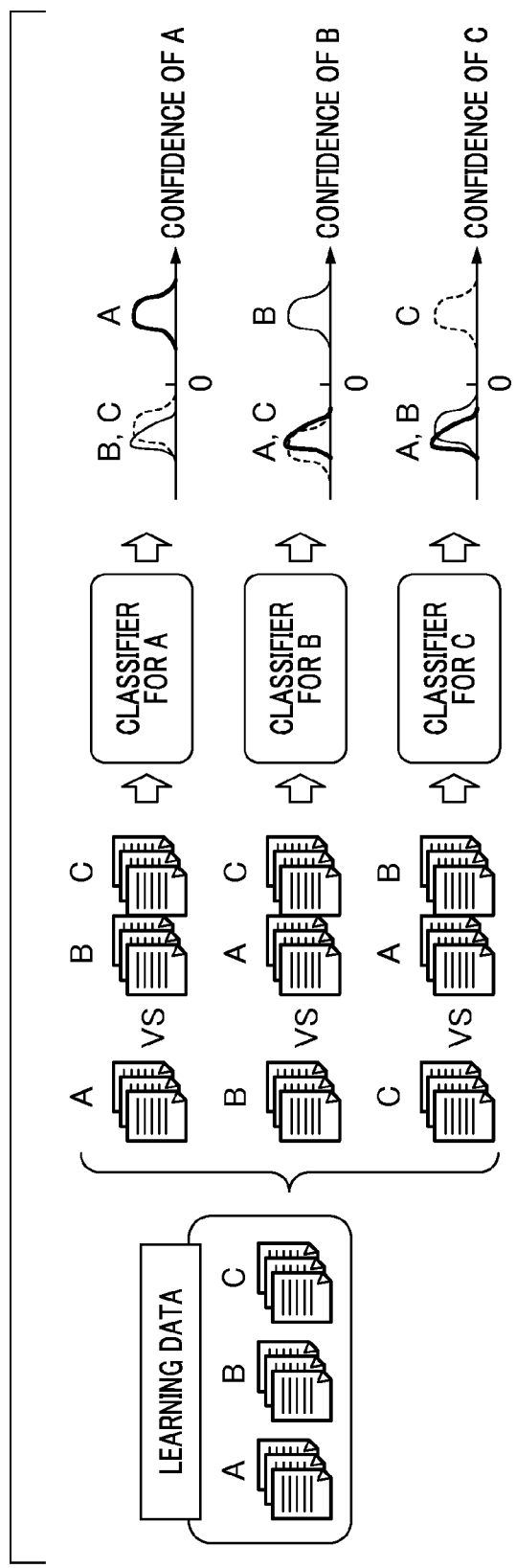
FIG. 10 is a diagram illustrating an example of machine learning using learning data.

FIG. 10 is a diagram illustrating an example of machine learning using learning data.

In this example, it is assumed that the image feature amounts each corresponding to three classes of document images (document image A, B, and C) are prepared as learning data. In "OVA", three types of classifiers are prepared for classifying these three classes. The three types of classifiers are a classifier A for classifying the document image A apart from the others, a classifier B for classifying the document image B apart from the others, and a classifier C for classifying the document image C apart from the others.

The classifier for A outputs a high output value (confidence) when a document image A is input, while it outputs a low output value (confidence) when a document image of the other class is input. The same applies to the classifiers for B and C. When an actual classification is performed, a document image is input into the three types of classifiers, and then, the output values are compared. For example, when the output of the classifier for B is the highest, the input document image is classified into the document image B.

The learning a multiclass classifier utilizing "Real Adaboost" and "OVA" and the document image classification utilizing the multiclass classifier described with reference to FIG. 10 are executed by the CPU 401. Note that a machine learning method available for the present embodiment is not limited to the above-described method. A known method, such as Support Vector Machine or Random Forest may be utilized. When the scheme of feature selection is not included in a machine learning method, and when classification speed is desired to be improved in classification, a known method for selecting a feature amount by utilizing, for example, a principal component analysis, a discriminant analysis, or the like, is performed. When the machine learning method is a two-class classifier, a known method such as All-Versus-All (AVA) or Error-Correcting Output-Coding (ECOC) except for "OVA" may be used.

As described above, according to the first embodiment, the method of increasing the number of learning data used in learning a classification rule can be switched depending on the type or characteristic of an image input device as represented by the MFP 10 and the mobile terminal 30. This cannot only increase the number of images, but also, prevent learning time from being increased as much as possible by switching the method of increasing the number of learning data set depending on an image input device to be used, as well as can realize learning a classification rule with high accuracy that is customized for each user.

Second Embodiment

In the first embodiment, it is contemplated that the same image input device is used in learning and classification. Additionally, the server 40 performs an image processing for reproducing an image change on an input image.

In a second embodiment, it is contemplated that the type of each image input device used in learning and classification is different. Specifically, it is contemplated that different types of MFPs are used as the image input device. The CPU 401 included in the server 40 first performs a correction processing on an input image (initial image) for converting it into a standard image, and then performs an image correction processing for reproducing an image change in order to increase the number of learning data (images). The term "standard image" refers to an image excluding any image change occurring in each image input device. If an input image is converted into a standard image when, for example, a plurality of MFPs exist in an office and each MFP performs learning an image classification rule, each MFP can eliminate the time for scanning an initial image. Furthermore, if the conversion into a standard image is possible and is performed on a classification every time, every image input device to be used may not need to learn an image classification rule. It is preferred, however, that the processing speed in classification is as fast as possible, and it is not effective to perform the conversion into a standard image every time. If an image correction suitable for an image input device to be used is applied to a standard image and with which the device learns an image classification rule, the reduction of processing speed in classification can be prevented. Only the differences between the present embodiment and the first embodiment will be described below.

Figure 11:
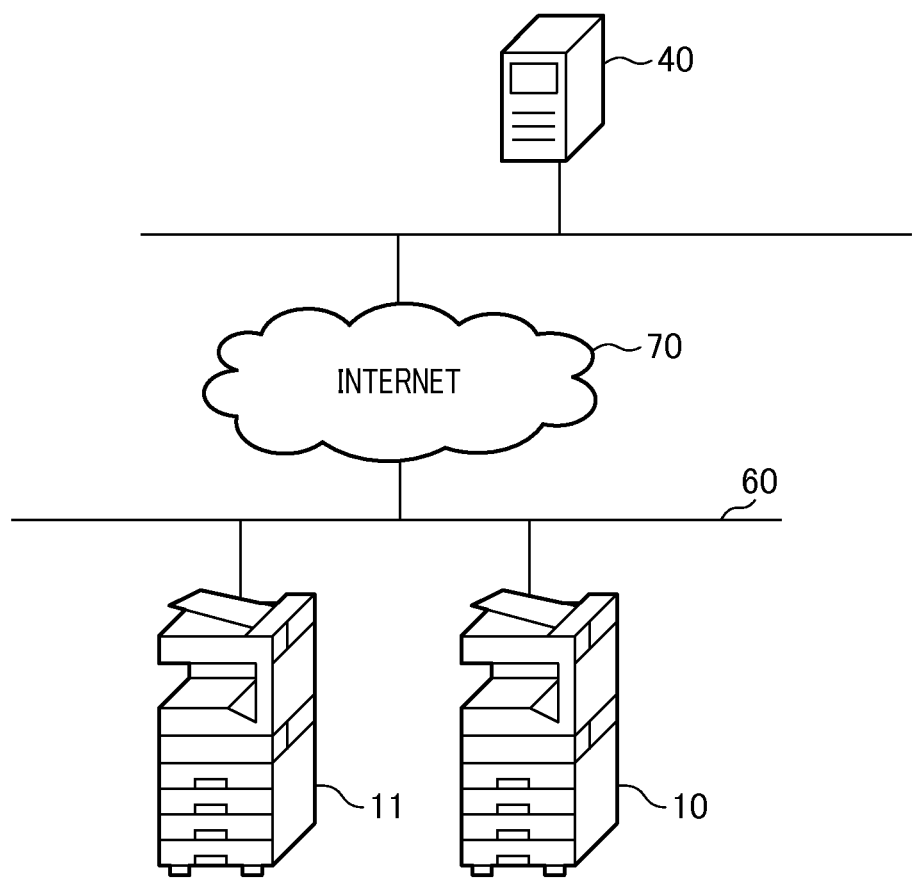
FIG. 11 is a diagram illustrating a system configuration according to a second embodiment.

FIG. 11 is a diagram illustrating a system configuration according to the second embodiment.

An MFP 11 is provided in place of the mobile terminal and the wireless LAN in the system configuration according to the first embodiment shown in FIG. 1. The MFP 11 has a configuration similar to that of the MFP 10 shown in FIG. 2A. In contrast to the first embodiment, the image reading unit 101 does not need a header information recording function. Unlike the first embodiment, device information does not have to be acquired from the header information on an initial image, because an image input device that inputs an initial image is different from one used in classification.

FIG. 12 is a flowchart illustrating processing for learning an image classification rule according to the second embodiment. In the present embodiment, the MFP 10 is used as an image input device in learning, and the MFP 11 is used as an image input device in classification, or this combination may be reversed.

Steps S1201 to S1204 are similar to the steps S501 to S504 in FIG. 5. In the second embodiment, the CPU 401 selects one image from the initial images that are received in step S1201 and stored in the HDD 405, and converts it into a standard image (step S1205). The details on step S1205 will be described below.

Next, the CPU 401 performs image correction processing on the standard image using the image correction parameter determined in step S1204 (step S1206). The image correction processing is similar to that in step S505 in FIG. 5. Steps S1207 to S1210 are similar to the steps S505 to S509 in FIG. 5.

FIG. 13 is a flowchart illustrating an example of the conversion processing into a standard image in step S1204 in FIG. 12.

First, the CPU 401 performs skew and positional shift corrections on an input image (step S1301). Specifically, the CPU 401 performs edge detection processing on an area near the edge of an input image and detects the frame of an original copy from the edge information using a Hough transform. When the frame of the original copy can be detected, the CPU 401 calculates a projective transformation matrix, such that the frame of the original copy is matched with the edge of an output image, so as to convert the image. When the frame of the original copy cannot be detected, the CPU 401 reduces the size of the input image and performs the edge detection processing on the entire image. The CPU 401 detects the inclination of the original copy in relation to the edge of a character area or ruled line from the edge information obtained by the edge detection processing using a Hough transform, and performs a skew correction by rotating the image by the inclination angle.

Next, the CPU 401 performs a density unevenness correction on the input image data to eliminate the shadow formed by folding or floating of the original copy when being scanned (step S1302). Specifically, the CPU 401 performs filter processing for eliminating the noise generated when the original copy is scanned, and then performs a tone correction such that the white background of a paper can be reproduced by removing the colors appearing in the background.

Next, the CPU 401 determines an image area, and divides character and/or line portions in a photographed image data from the other portions, and gives the attribute flag to each pixel (step S1303). Then, the CPU 401 executes a sharpness correction (step S1304). Specifically, the CPU 401 performs a filter processing on the pixels of the character and line portions, and corrects the character and line portions so that they become sharp.

Next, the CPU 401 performs character monochromatic processing (step S1305). Specifically, the CPU 401 reproduces the pixels of a character with a monochrome color so that they become sharp. For example, a method is used in which the RGB values of pixels are averaged to reproduce a certain character and the averaged value is applied as the color of the character, or the like.

According to the second embodiment, if each image input device used in learning and classification is different, once the conversion into a standard image is performed, the number of learning data can be increased depending on an image input device used in classification. This can eliminate the need to scan an original copy by each image input device used in classification as well as the need to perform conversion into a standard image for every time of classification. As a result, the reduction of a processing speed can be prevented as compared with the case when the conversion into a standard image is performed for every time of classification.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium, to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus that generates learning data used in learning a classification rule for classifying an image that is input from an image input device, the apparatus comprising:
   at least one processor operatively coupled to a memory, serving as:
   (a) a reception unit configured to receive an initial image that is input from the image input device;
   (b) a first generation unit configured to generate an image that is different from the initial image, by correcting the initial image using a coefficient determined based on information about a type of the input device;
   (c) a second generation unit configured to generate the learning data using the image generated by the first generation unit and the input image; and
   (d) a learning unit for generating the classification rule using the learning data generated by the second generation unit.

2. The information processing apparatus according to claim 1, wherein
the coefficient is a correction parameter for correcting an image depending on the characteristic of an image input device, and
the first generation unit generates the image that is different from the initial image by performing correction processing of an image using the correction parameter.

3. The information processing apparatus according to claim 2, wherein the correction processing of an image using the correction parameter includes at least one of rotation processing, shift processing, scaling processing, and blurring processing of an image.

4. The information processing apparatus according to claim 3, wherein, if the correction processing of an image using the correction parameter includes rotation processing of the image, the parameter of the rotation processing is a rotation amount, and the first generation unit determines:
   (i) if the image input device is an image processing apparatus, the rotation amount based on a standard for skew of an image reading unit included in the image processing apparatus, and
   (ii) if the image input device is a mobile terminal, the rotation amount based on information on image deterioration caused by original copy extraction from an image photographed by the mobile terminal.

5. The information processing apparatus according to claim 3, wherein the parameter of a shift processing is a shift amount if the correction processing of an image using the correction parameter includes the shift processing of the image, and the first generation unit determines:
   (i) if the image input device is an image processing apparatus, the rotation amount based on a standard for the positional shift of an image reading unit included in the image processing apparatus, and
   (ii) if the image input device is a mobile terminal, the shift amount based on information on image deterioration caused by original copy extraction from an image photographed by the mobile terminal.

6. The information processing apparatus according to claim 3, wherein the parameter of scaling processing is a scaling rate if the correction processing of an image using the correction parameter includes the scaling processing of the image, and the first generation unit determines:
   (i) if the image input device is an image processing apparatus, the scaling rate based on the standard about the reading magnification of an image reading unit included in the image processing apparatus, and
   (ii) if the image input device is a mobile terminal, the scaling rate based on information on image deterioration caused by original copy extraction from an image photographed by the mobile terminal.

7. The information processing apparatus according to claim 3, wherein if the correction processing of an image using the correction parameter includes blurring processing of the image, the blurring processing is processing for generating a blurred image depending on blurring and shaking amounts determined by a kernel size of a Gaussian filter, the parameter of the blurring processing being kernel size, and the first generation unit determines:
   (i) if the image input device is an image processing apparatus, the blurring amount and thus the kernel size based on corresponding information between a Multi Function Peripheral (MTF) characteristic of a line sensor included in the image processing apparatus and a blurring amount, and
   (ii) if the image input device is a mobile terminal, the blurring amount and thus the kernel size based on corresponding information between the MTF characteristic of a lens included in the mobile terminal and a blurring amount.

8. The information processing apparatus according to claim 1, wherein the learning data is a feature amount of an image generated by the first generation unit.

9. A method of controlling an information processing apparatus that generates learning data used in learning a classification rule for classifying an image that is input from an image input device, the method comprising:
  receiving an initial image that is input from the image input device;
  generating, in a first generation step, an image that is different from the initial image, by correcting the initial image using a coefficient determined based on information about a type of the input device;
  generating, in a second generation step, the learning data using the image generated in the first generation step and the input image; and
  generating, in a learning step, the classification rule using the learning data generated in the second generation step.

10. The method of controlling an information processing apparatus according to claim 9, wherein the learning data is a feature amount of an image generated by the first generation unit.

11. A non-transitory storage medium storing a readable program for causing a computer to execute a controlling method executed in an information processing apparatus that generates learning data used in learning a classification rule for classifying an image that is input from an image input device, the method comprising:
  receiving an initial image that is input from the image input device;
  generating, in a first generation step, an image different from the initial image, by correcting the initial image using a coefficient determined based on information about a type of the input device; and
  generating, in a second generation step, the learning data using the image generated in the first generation step and the input image; and
  generating, in a learning step, the classification rule using the learning data generated in the second generation step.

12. The method of controlling an information processing apparatus according to claim 9, wherein
  the coefficient is a correction parameter for correcting an image depending on the characteristic of an image input device, and
  the first generation step generates the image that is different from the initial image by performing correction processing of an image using the correction parameter.

13. The method of controlling an information processing apparatus according to claim 12, wherein the correction processing of an image using the correction parameter includes at least one of rotation processing, shift processing, scaling processing, and blurring processing of an image.

14. The method of controlling an information processing apparatus according to claim 13, wherein, if the correction processing of an image using the correction parameter includes rotation processing of the image, the parameter of the rotation processing is a rotation amount, and the first generation step determines:
  (i) if the image input device is an image processing apparatus, the rotation amount based on a standard for skew of an image reading unit included in the image processing apparatus, and
  (ii) if the image input device is a mobile terminal, the rotation amount based on information on image deterioration caused by original copy extraction from an image photographed by the mobile terminal.

15. The information processing apparatus according to claim 13, wherein the parameter of a shift processing is a shift amount if the correction processing of an image using the correction parameter includes the shift processing of the image, and the first generation step determines:
  (i) if the image input device is an image processing apparatus, the rotation amount based on a standard for the positional shift of an image reading unit included in the image processing apparatus, and
  (ii) if the image input device is a mobile terminal, the shift amount based on information on image deterioration caused by original copy extraction from an image photographed by the mobile terminal.

16. The method of controlling an information processing apparatus according to claim 13, wherein the parameter of scaling processing is a scaling rate if the correction processing of an image using the correction parameter includes the scaling processing of the image, and the first generation step determines:
  (i) if the image input device is an image processing apparatus, the scaling rate based on the standard about the reading magnification of an image reading unit included in the image processing apparatus, and
  (ii) if the image input device is a mobile terminal, the scaling rate based on information on image deterioration caused by original copy extraction from an image photographed by the mobile terminal.

17. The method of controlling an information processing apparatus according to claim 13, wherein if the correction processing of an image using the correction parameter includes blurring processing of the image, the blurring processing is processing for generating a blurred image depending on blurring and shaking amounts determined by a kernel size of a Gaussian filter, the parameter of the blurring processing being kernel size, and the first generation step determines:
  (i) if the image input device is an image processing apparatus, the blurring amount and thus the kernel size based on corresponding information between a Multi Function Peripheral (MTF) characteristic of a line sensor included in the image processing apparatus and a blurring amount, and
  (ii) if the image input device is a mobile terminal, the blurring amount and thus the kernel size based on corresponding information between the MTF characteristic of a lens included in the mobile terminal and a blurring amount.

18. The non-transitory storage medium according to claim 11, wherein
  the coefficient is a correction parameter for correcting an image depending on the characteristic of an image input device, and
  the first generation step generates the image that is different from the initial image by performing correction processing of an image using the correction parameter.

19. The non-transitory storage medium according to claim 18, wherein the correction processing of an image using the correction parameter includes at least one of rotation processing, shift processing, scaling processing, and blurring processing of an image.

20. The non-transitory storage medium according to claim 19, wherein, if the correction processing of an image using the correction parameter includes rotation processing of the image, the parameter of the rotation processing is a rotation amount, and the first generation step determines:
(i) if the image input device is an image processing apparatus, the rotation amount based on a standard for skew of an image reading unit included in the image processing apparatus, and
(ii) if the image input device is a mobile terminal, the rotation amount based on information on image deterioration caused by original copy extraction from an image photographed by the mobile terminal.

21. The non-transitory storage medium according to claim 19, wherein the parameter of a shift processing is a shift amount if the correction processing of an image using the correction parameter includes the shift processing of the image, and the first generation step determines:
(i) if the image input device is an image processing apparatus, the rotation amount based on a standard for the positional shift of an image reading unit included in the image processing apparatus, and
(ii) if the image input device is a mobile terminal, the shift amount based on information on image deterioration caused by original copy extraction from an image photographed by the mobile terminal.

22. The information processing apparatus according to claim 19, wherein the parameter of scaling processing is a scaling rate if the correction processing of an image using the correction parameter includes the scaling processing of the image, and the first generation step determines:
(i) if the image input device is an image processing apparatus, the scaling rate based on the standard about the reading magnification of an image reading unit included in the image processing apparatus, and
(ii) if the image input device is a mobile terminal, the scaling rate based on information on image deterioration caused by original copy extraction from an image photographed by the mobile terminal.

23. The non-transitory storage medium according to claim 19, wherein if the correction processing of an image using the correction parameter includes blurring processing of the image, the blurring processing is processing for generating a blurred image depending on blurring and shaking amounts determined by a kernel size of a Gaussian filter, the parameter of the blurring processing being kernel size, and the first generation step determines:
(i) if the image input device is an image processing apparatus, the blurring amount and thus the kernel size based on corresponding information between a Multi Function Peripheral (MTF) characteristic of a line sensor included in the image processing apparatus and a blurring amount, and
(ii) if the image input device is a mobile terminal, the blurring amount and thus the kernel size based on corresponding information between the MTF characteristic of a lens included in the mobile terminal and a blurring amount.

24. The non-transitory storage medium according to claim 11, wherein the learning data is a feature amount of an image generated by the first generation unit.

* * * * *